United States Patent [19]

Darjee et al.

[11] Patent Number: 4,584,227
[45] Date of Patent: Apr. 22, 1986

[54] JOINING TAPE

[75] Inventors: Dhiraj H. Darjee, Ballston Lake; Daniel E. Devine, Green Island, both of N.Y.

[73] Assignee: Norton Company, Worcester, Mass.

[21] Appl. No.: 672,988

[22] Filed: Nov. 19, 1984

[51] Int. Cl.$^4$ .............................. B32B 5/12; C09J 7/02
[52] U.S. Cl. .................................... 428/113; 156/177; 428/220; 428/295; 428/343
[58] Field of Search ................. 428/61, 343, 295, 480, 428/113; 427/173; 156/177

[56] References Cited

U.S. PATENT DOCUMENTS 4,215,516  8/1980  Huschle et al. ................... 428/61 X
4,528,214  7/1985  Long et al. ........................ 427/173

Primary Examiner—Thomas J. Herbert
Attorney, Agent, or Firm—Frank S. Chow

[57] ABSTRACT

Tape or patch material for making joints which have good tensile strength includes a reinforcing array of yarns arranged within a narrow range of angles around the direction of application of probable stress on the joint. The distribution of yarns angles within a small range rather than exactly parallel to each other gives the joint greater splitting resistance with very little loss in strength, and it permits toleration of less precise alignment of tape when the joint is made.

The patch material is particularly useful for joining coated abrasives into endless belts. For such joints, it has long been known that better results are achieved if the joint makes an angle other than perpendicular with the edges of the belt. Patch material particularly convenient for making such angled joints can be made by laying out the reinforcing yarns between two parallel carrier strips, with the yarns symmetrically disposed around a smaller angle with the strips which is the same as the smaller angle which the desired joint will make with the edges of the belt, then encapsulating the array of yarns in adhesive and processing the adhesive to give it cohesion. The adhesive-encapsulated, yarn-containing web can then be slit on a conventional straight slitter to the proper width for reinforcing the joints to be formed. Lengths of the web thus slit, when applied to the angled joints to be formed, will have their reinforcing yarns symmetrically disposed around the running direction of the belts made.

For best results, the yarn array should be compressed after encapsulating it with adhesive, so that the final patch material has at least as high a volume of yarn as of adhesive.

16 Claims, 10 Drawing Figures

16J3 → EXP 2    90X

15X

JOINING TAPE

BACKGROUND OF THE INVENTION

1. Field of the Invention

A common requirement of industry and commerce is to convert a material manufactured in continuous web form into an endless belt. One of the most common methods for accomplishing this purpose is called a butt joint. To make such a joint, a suitable length of the web material, hereinafter called the prime web, which is desired for the bulk of the belt, is cut and looped so that the cut ends adjoin, and a narrow space between the cut ends is filled with a suitable adhesive. If, as is normal, the web is relatively thin compared with its width and length, a reinforcing material is usually added to strengthen the butt joint so formed.

The reinforcing material considered here and called a tape or patch material is itself a relatively thin web from which is cut a strip of sufficient width to extend for an appropriate distance on each side of the butt joint to be reinforced and of sufficient length to extend across the width of the belt to be formed, at whatever angle is desired. The patch material is placed on one side of the endless belt formed by a simple butt joint and adhesively attached to the prime web on at least one side thereof in such a position that part of an integral piece of the patch material is attached to both of the ends of the length of primary web which abut to form the butt joint. The adhesive which attaches the patch to the prime web is normally continuous with the adhesive which fills the space between the ends of the prime web.

A patch reinforced butt joint of the type described here is illustrated in FIG. 1 of U.S. Pat. No. 4,215,516 to Huschle et al. (hereinafter cited simply as Huschle). The prime web as described herein is designated 10 in the Huschle Figure, with ends 12 and 13 abutting at joining line 14. Item 16 of the Huschle Figure, regarded here simply as a web without any restriction as to its detailed structure, is the patch material as defined here.

The instant invention is particularly adapted to provision of patch materials suitable for use in forming endless belts of coated abrasive products. Because coated abrasive belts are commonly used at fairly high tensions to assure mechanical control, patch materials for such belts must be resistant to tensile breakage. Because many machines which use coated abrasive belts have only limited capacity to adapt to any stretch or elongation of the belts which may develop during use, patch materials for coated abrasives should resist stretch under the tensions applied. Because many coated abrasive belts are used to achieve precise dimensional control of the objects worked by them and because achievement of such control is often promoted by minimal variation of the thickness of a coated abrasive belt along its length, it is advantageous tor patch materials to be thin, so that the part of the belt to which the patch is attached will not be adversely thicker than the remainder of the belt. As shown in the already referenced Huschle Figure, part of the thickness of many coated abrasive prime webs can be removed in the zone of the joint to accommodate the patch. However, it will be appreciated that such removal of material can not be extended beyond a certain limit without seriously weakening the prime web. Even when precise dimensional control of workpieces is not required, substantial variations in thickness or stiffness of a coated abrasive belt may cause unacceptable surface blemishes, known in the art as "chatter marks", on the workpieces finished with sucn belts. It is an object of this invention to provide patch materials capable ot meeting all these diverse requirements, in a manner superior to those patch materials previously known, at acceptable cost.

2. Description ot the Prior Art

A wide variety of patch materials have been employed in the coated abrasive industry, but the most common ones in recent years have been woven fabrics and biaxially stretched polyethylene terephthalate films. The tabrics have varied widely in construction, but have usually featured synthetic multifilament yarns as the primary strengtn members in either the warp or fill direction of the fabric. Normally such fabrics are significantly weaker in whichever direction is perpendicular to tne one with most strength. Tnis promotes efficient use of textile yarns for the purpose, because in a joined belt only those yarns of the patch material which lie in or near the machine direction of the belt will normally make any significant contribution to the strength and stretch resistance of the joint.

One of the persistent difficulties with the use of woven cloth as a patch material is that most coated abrasive belts have the joints formed at an angle distinctly different from the perpendicular to the edge of the belt. The angle, measured trom the edge on the "longer" side of the coated abrasive prime web when considering only one end of the web, is most often between 35 and 60 degrees, although it can range from near zero to the maximum possible ninety degrees. Conventional weaving produces fabric in which all yarns are either parallel or perpendicular to the direction of weaving. If such a fabric is to be used most efficiently as a patch material for coated abrasive belts joined at an angle significantly ditterent from perpendicular, the patch fabric must be cut in nonrectangular parallelogram shape for each patch, so that an approximately equal width ot patch material will lie on each side ot the joint across the whole width of the belt and there will be no overhang of patch material at the belt edges. Also, for maximum efficiency in the use of the often expensive textile yarns which provide the strength of the patch material fabric in its strongest direction, the patch must be oriented when cut so that these yarns will lie in or near the machine direction of the belt to be joined when applied to the belt.

On a commercial scale, which currently requires the manufacture of hundreds of millions of coated abrasive belts in the United States every year, the proper shaping of the patch material is accomplished by slitting it to the width appropriate for use, usually 10–25 mm, from fabric coated with adhesive in much wider width such as one to two meters. As will be apparent from the paragraph above, such slitting must be done at a bias angle to the original machine direction of the fabric to be made into patch in order to achieve the proper orientation of yarns when the final slit patch material is applied to the belt to be joined. Various ingenious means, including biased slitting of fabric joined into a wide endless belt or even woven originally and coated in tubular form, have been described in the prior art to accomplish efficient preparation of patch material with the correct final orientation of its major reinforcing yarns, but the process remains considerably more complex and expensive than desirable.

Another disadvantage ot woven fabrics as the primary strength members for patch material was recognized and largely overcome in the Huschle patent already cited. The problem is described at column 3 lines 29-51 of the Huschle specification. Briefly, it involves abrasion of yarns of the fabrics against each other as coated abrasive belts are flexed during use. Huschle describes a patch material in which textile yarns are used for reinforcement without weaving the yarns into a fabric first. In this way the expense of the weaving process and of the cross direction fibers required for weaving are eliminated, and better use of the strength of the yarns which are used is achieved, because these yarns are not distorted in the manner which is inherent in weaving. Instead, the yarns are laid out in parallel array and held in place by the same adhesive which will later bond the yarns to the belt to be joined. Sometimes a metal foil, plastic film, or other auxiliary web is used either temporarily or permanently to aid in handling the Huschle type patch material.

Although the Huschle patch material, called "unidirectional tape", has many advantages and has attained substantial commercial use, it still has certain undesirable characteristics. One of these is relatively low resistance to splitting. Because all the yarns in the unidirectional tape are parallel to each other within a rather small tolerance, none of the yarns can contribute much resistance to mechanical forces directed parallel or nearly parallel to the yarns, such as the forces which initiate splitting of the patch along a line parallel to the direction of belt travel during use. Furthermore, once a split is initiated, it can readily propagate in the space between two nearest neighbor yarns of the Huschle patch, because propagation in such a direction never encounters a strong yarn which might terminate it, if breaking the yarn were necessary for the split to continue propagating. Secondly, the methods described by Huschle for commercial scale preparation of patch material still require biased slitting or some similar expedient as described above in order to achieve efficient yarn orientation in the patch when it is used. It is an object of the present invention to overcome these two disadvantages of the product and process described by Huschle while retaining most or all of their advantages.

SUMMARY OF THE INVENTION

We have found that a joining tape or patch material which retains most or all of the advantages of Huschle's product but has better splitting resistance can be achieved by using a yarn array which we describe as "straight laid" and "narrowly multidirectional". The yarns are described as "straight laid" because they are not deliberately curved, woven, or sewn or knitted into loops but instead are disposed as nearly straight and coplanar as is practicable and are held in place with respect to each other by adhesive. "Narrowly multidirectional" means that the yarns, and the individual monofilaments of which the yarns may be composed, are arranged in a pattern in which the angles that the yarns or filaments make with respect to a given reference direction are distributed in a range which is fairly narrow but not so narrow as to leave any path of substantial length in any direction in the patch material which does not cross at least one yarn. Specifically, in any contiguous sample of patch material sufficiently large to contain at least five thousand filaments, there will be an upper limit within which will lie at least 95% of the filament angles in the sample, the angles being measured with respect to a reference direction which gives the smallest average angle for the entire array. There will also be a lower limit within which no more than 60% these filament angles for the sample will lie. Our maximum upper limit is 20° and our minimum lower limit is 0.5°. Our preferred upper limit is 5° and our preferred lower limit is 1.5°.

It will be appreciated from this description that this type of patch material is different from Huschle's unidirectional tape, because almost all the yarns in that product usually lie within a very narrow range of angles such as 0.4°. The product of our invention is also distinct from any patch material which might be reinforced with any of the various types of random-laid or cross-laid non-woven textile products. The yarns, filaments, or fibers of these latter types of products are often not straight for any considerable distance, and even if they are straight, they lie at angles too widely distributed to fall within the scope of our invention.

The distribution of yarn angles leads to some yarn cross-over points in our product, but considerably fewer than would be found in most woven fabrics which have been used for joint patch material. As already noted above, the presence of yarn cross-over points in woven patch fabric is likely to lead to fatigue-induced weakening of the patch when the belt is used. Whether because of the lower density of cross-overs, the fact that the yarns in our product are not as constrained in moving with respect to each other as in a woven fabric, or for some other unknown reason, the yarn cross-overs in the product of our invention do not lead to fatigue failure within practical coated abrasive belt lifetimes.

The presence of substantial fractions of the yarns or filaments at angles slightly divergent from those of other substantial fractions of such yarns or filaments in the tapes of our invention leads to at least one advantage in addition to the splitting resistance already noted: The alignment of the patch with the belt need not be quite as precise as with unidirectional tape in order to make a satisfactory belt.

While it might be expected intuitively that patch material made according to our invention would inherently be at least twice as thick as material made from the same yarns by the Huschle technique, as a result of the yarn overlap which is an inherent feature of our product, we have found that such a large increase in thickness does not in fact occur when, as we prefer, the yarns used are of the multifilament type and are either untwisted or very lightly twisted. Instead, the pressure exerted on the web at crossover points causes the two yarns to assume a flatter shape in the vicinity of such points by spreading their various component filaments more widely than usual in such zones. By this mechanism, total patch material thicknesses which are satisfactory in practice and no greater than those described by Huschle can be readily achieved.

We have found that the type of yarn and/or filament array needed for the new patch material of our invention can conveniently be obtained by laying out two subarrays of approximately equal numbers of yarns, with the yarns parallel to each other within each array and the two arrays at an angle of about half to two-thirds that of the upper limit desired for the eventual patch material. These subarrays are held in position until they can be embedded in adhesive, which subsequently holds them in place. Simultaneously with or subsequently to the application of adhesive, the total array is preferably compressed, usually by passing the web between rollers, so that the normally round original yarns are flattened and have their filaments spread somewhat apart, particularly near cross-over points as noted above. More preferably the array is compressed sufficiently so that the volume of the textile portion of the final patch material of our invention is at least as great as the volume of the adhesive which surrounds it.

We have also determined that by suitable mechanical means, it is possible to prepare the patch materials of our invention, unidirectionally reinforced patch material such as that described by Huschle, or other types of joining tapes reinforced with straight laid yarns, in the form of continuous webs which will yield patches of satisfactory yarn alignment when slit parallel to the edge of the web, thereby avoiding the difficulty and expense of bias slitting as described above. This is accomplished by laying out the reinforcing yarns at suitable angles to the direction of motion of two continuous yarn carrier strips which bear a plurality of yarn restrainers capable of restraining individual yarns, encapsulating the central portion of the composite yarn array thus laid out with sufficient adhesive to hold them in place with respect to each other, preferably compressing the web formed by textile fiber and adhesive as described above, and then detaching the web thus formed continuously from the yarn carrier strips. The smaller of the two angles which the straight laid yarns make with the line of the yarn carrier strips should be approximately the same as the smaller of the two angles the line of the joint makes with the edge of the belt to be formed.

DESCRIPTION OF THE PREFERRED EMBODIMENTS

Figure 1:
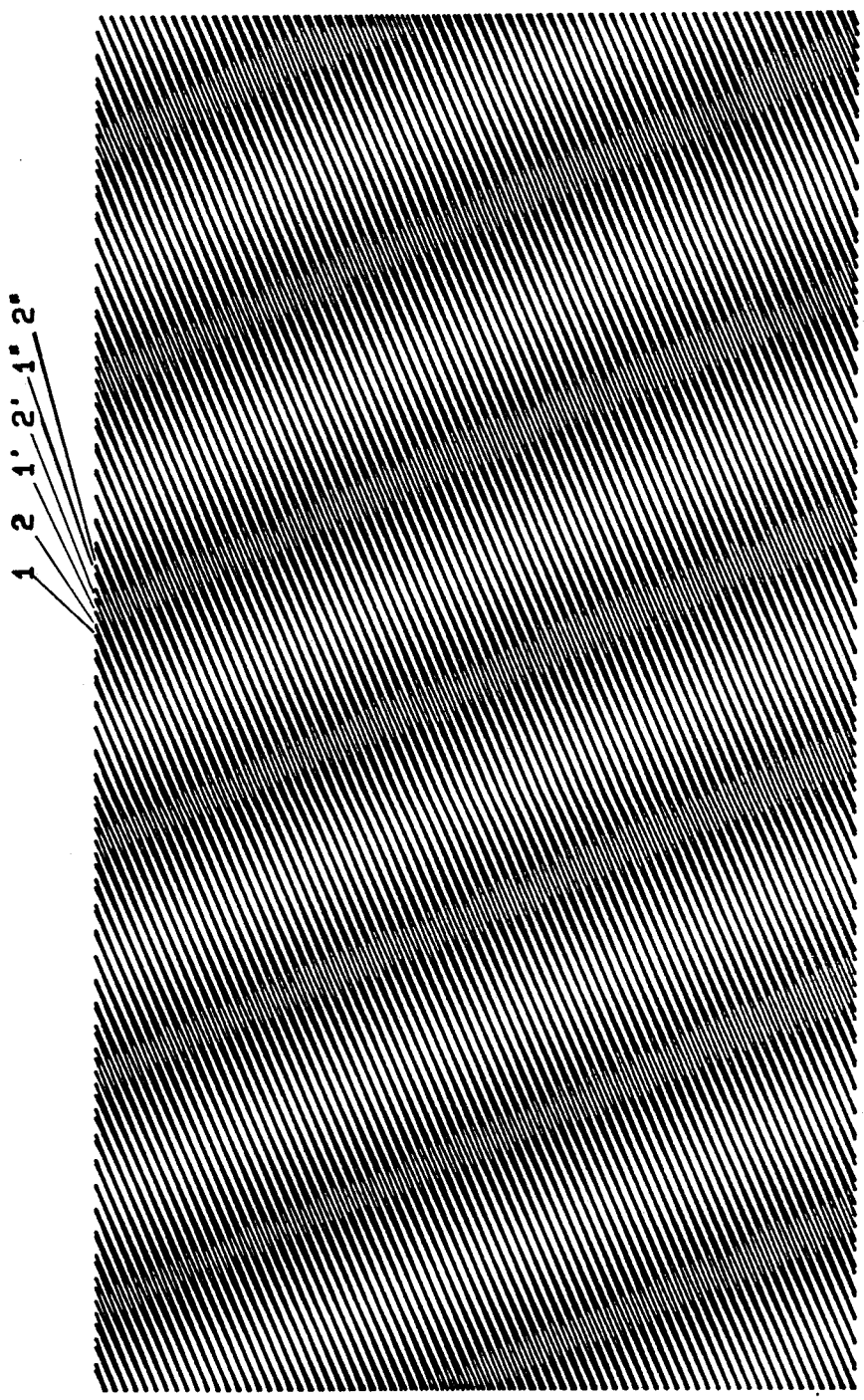
FIG. 1 shows a representative example of the yarn configuration before compression during the preferred process for making a patch material of our invention.

Any type of yarn with adequate tensile strength and elongation resistance for the purpose can be used to make patch material or joining tape according to our invention. Glass, steel, carbon, and the entire range of natural and synthetic organic types of yarn could all be useful for the purpose. However, as briefly noted above, for most purposes we prefer synthetic continuous multifilament organic type yarns, such as aramids (sold primarily by E. I. du Pont de Nemours & Co. under their trade names Nomex and Kevlar), polyamides, and polyesters such as polyethylene terephthalate, with high tenacity varieties of the latter material especially preferred for their combination of strength, stretch resistance, and economy. Most preferably, these yarns should be untwisted. If they are twisted, there should be no more than one turn per centimeter. The less twist present in the yarn, the more readily can the yarns flatten and spread their filaments evenly when the patch material is compressed after application of adhesive. Yarns with an original flat or ribbon shape can make very satisfactory patch, but they are more difficult to process through the machine described below as the best mode for making the tape of our invention.

At least one of the processes of encapsulating the yarns in adhesive or using the patch material later often will include brief heating of the yarns above room temperature. When such heating is anticipated, it is preferred to allow the yarns used for making the patch material to preshrink under heating before forming them into the patch material. This process may be accomplished by any convenient conventional means. When the initial array of yarns before compression is laid out by the preferred process as described below, the preshrinking is most preferably accomplished by heating the yarns while on their restrainer hooks to a temperature of about 93°-176° C., thereby causing them to shrink about 2% of their original length.

Normally it is advantageous to use yarns of a single size and shape in making a particular type of patch material, because this gives the most efficient combination of maximum strength and stretch resistance with minimum thickness available with the particular yarn material used. Similarly, it is normal to space uniformly the yarns of each of the coparallel arrays used in the method of making the patch described above, because such an arrangement leads to more nearly consistent properties, e.g., a preferred minimum 1000 filaments/cm of patch material over its entire width, but none of these uniformities is vital to our invention.

The total tensile strength of the patch material should generally be chosen so that it is at least as great as the tensile strength of the particular prime web to be joined, although the minimum strength necessary is obviously determined by the force which the joined belt is expected to withstand rather than directly by the characteristics of the prime web. For coated abrasive products, patch materials with a tensile strength of 35-70 dekanewtons per centimeter of width (hereinafter abbreviated daN/cm) are generally useful, with smaller tensile strength values often adequate for belts to be used in relatively light duty. An elongation of no more than 3% at 18 daN/cm is generally satisfactory, but in critical cases the elongation should be adjusted to the contemplated use of the belts to be made. Both the strength and elongation of the patch material and/or the joints made with it should be determined by experiment, because these properties of the patch and/or the joint often appear to depend on a complex interaction among the characteristics of the textile part of the patch, the adhesive used for the patch and the joint, and the characteristics and mode of preparation of the prime web to be joined. If it is important to make the patch material as economical as possible, it may be feasible to use patch with tensile strength somewhat less than that required in the joint, because in favorable cases the prime web can contribute to the joint strength. If safety is more important than maximum economy, the patch itself can be made as strong as the joint is required to be, with confidence in such cases that when proper adhesives and prime web surface preparation are used, the joint will be strong enough and probably have a substantial safety factor. Obviously, choices intermediate between these extremes may also be made.

We have found that joining adhesives established in the prior art also work adequately with our invention, and for joining coated abrasives we prefer to use such established adhesive formulations as those in U.S. Pat. No. 4,215,516, 3,872,629, 3,770,555, 3,763,604, 3,665,660, and 3,637,359. Either liquid or softenable film adhesives may be applied to the yarn arrays in the manufacture of patch material according to our invention, but the adhesive must have sufficient cohesion and solidity to hold the yarns in place before removal of the patch material from whatever mechanical device is used to obtain proper initial orientation of the yarns in the patch material. The adhesive must also remain softenable enough to form an appropriate bond to the prime web to be joined when applied to that web under appropriate heat and pressure as conventional in the various arts in which our invention may be applied.

For convenience and ease of handling, auxiliary web materials such as metal foils, plastic film, release papers, etc. may be used as part of the patch material made according to our invention. Such auxiliary materials may be removed in the final joined belts or may be retained there in certain cases. These and many other variations may be used in conjunction with our invention without departing from the essence thereof as defined by the appended claims.

The characteristics and use of our patch material may be further understood from the following examples.

EXAMPLE 1

The yarns for the patch material of this example were each 440 denier 100 filament number high tenacity polyester (with tenacity approximately 8 gm/denier). These yarns had minimum commercially available twist, a maximum of less than one turn per centimeter. The yarns were initially straight laid in two distinct subarrays which intersected each other at an angle of about 2.7° as shown in FIG. 1, which is at about 2X magnified scale. Each of the two subarrays consisted of 12 substantially evenly spaced yarns per centimeter of width (cm). The yarns of each subarray were parallel within 0.4° as laid out before compression. A top view of a portion of the total composite yarn array at this stage is shown in FIG. 1. The yarns marked 1, 1', 1'', and all others parallel to these constituted one subarray, while the yarns marked 2, 2', 2'', and all others parallel to these constituted the other subarray. With the composite array held in place by the mechanical means to be described below, the yarns in the array were heated by use of an infrared lamp to about 250° F., thereby causing them to shrink slightly and be held more tautly in the array. Then a 0.06 mm thick film of dry but readily softenable adhesive, prepared according to the directions of Example 2 of U.S. Pat. No. 3,770,555, was applied to each side of the preshrunk composite yarn array and bonded thereto under a pressure of about 40 daN/cm at a temperature of about 85° C. for a period of about 5 seconds. The patch material thus prepared was found to have a thickness of about 0.15 mm and a tensile strength of about 50 daN/cm along the direction halfway between the orientation directions of the two original yarn subarrays in the patch.

Figure 2:
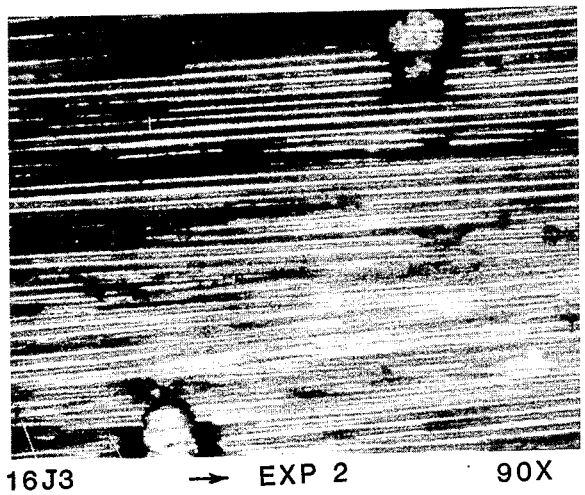
FIG. 2 is a photomicrograph at approximately 90 X magnification of a typical example of the filament configuration after compression and laminating.
Figure 3:
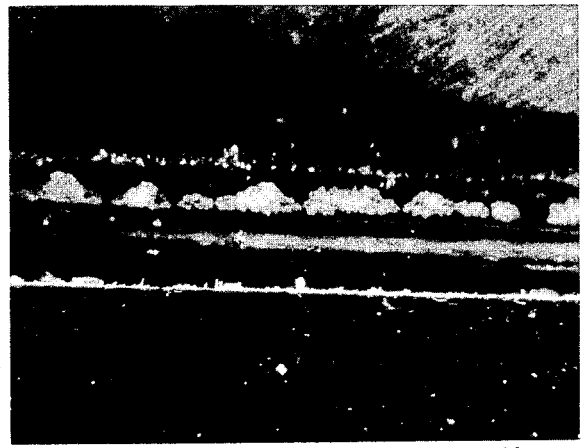
FIG. 3 is a photomicrograph at approximately 15 X magnification of a cross section of an example patch material of our invention ready for use.

The compression causes the yarns in the patch and the filaments of which they are composed to spread over a wider area than is shown in FIG. 1. A top view of the filament positions in a typical piece of patch material prepared according to this example is shown in FIG. 2. In order to expose the filaments more clearly to view, as much as practicable of the adhesive was removed before this picture was taken, but some adhesive still remains visible as dark material between the filaments. The two subarrays of filaments are readily visible in this figure, although those of one subarray are more often obscured by the overlying filaments of the other subarray in this relatively small sample than would be found in a sufficiently large sample. It is apparent that compression of the yarn has substantially increased the overall cover factor compared with the original array of FIG. 1. A cross-sectional view of the same type of patch material is shown in FIG. 3. This figure, in which the individual monofilaments that were prominent in FIG. 2 are only faintly visible, shows that compression has caused most of the yarns to be considerably flattened from their original round shape. In some places, the boundaries between yarns have become obscured, presumably as result of compression at crossover points, and for the same reason, some of the flattened mounds have about twice the volume of the smallest ones. The largest mounds presumably represent areas where almost all the bulk of two originally distinct yarns has merged into one group of filaments in which the original distinction between yarns has become essentially impossible to resolve in a cross section. This cross sectional view also confirms the increase in cover achieved by compression; only very small spaces between the yarns are visible in this figure.

The joining tape or patch material prepared as described above was applied to a conventionally backrubbed coated abrasive cloth product (Grit Z60X Nor-Zon R823, available from Norton Company, Worcester, Mass.) to join it into an endless belt. The ends of the piece of coated abrasive to be joined were cut in a serpentine pattern centered around a straight line at an angle of 67° to the edge of the belt, this angle being measured from the edge on the longer side of the cut when looking at only one end. The serpentine pattern occupies a zone about 12 mm in width, and the pattern on both ends mates when the coated abrasive piece to be joined is formed into an endless belt. A length of patch material about 25 mm in width was slit from a wider web such as that shown in FIG. 1 along slitting lines which would be vertical in that Figure. A sufficient amount of this length of patch material to stretch across the belt along the line of the joint was applied to the backrubbed surface of the coated abrasive in such a manner that the yarns and filaments in the patch were oriented within a few degrees of being parallel to the edges of the endless belt and the center line of the patch was substantially aligned with the center line of the serpentine pattern of the joint.

The aligned patch and the coated abrasive ends covered by the patch were then pressed at a pressure of about 10 daN/cm of width for 3 seconds between metal bars heated to about 149° C. This pressing operation, called a pre-cure, is sufficient to allow the joined belt to be moved with moderately careful handling without danger of joint separation. The pre-cured joint was then subjected to a final pressing between metal bars at a pressure of about 715 daN/cm for a period of 30 seconds. During this final pressing, the bar touching the coated side of the coated abrasive was maintained at a temperature of about 115° C. and the bar touching the patch material was maintained at about 127° C. A satisfactory joint for commercial use was formed.

EXAMPLE 2

This patch material was prepared in the same manner as for Example 1, except that (1) the composite yarn array was treated with a liquid adhesive before applying the dry film adhesive and (2) a 0.025 mm thick film of biaxially stretched polyethylene terephthalate film (Mylar from du Pont) was applied outside the layer of dry adhesive on one side only. The liquid adhesive used was of the general type described in U.S. Pat. No. 3,872,629. The patch material so prepared had a thickness of 0.16 mm and a tensile strength of 53 daN/cm and when used under the same pressing conditions as given in Example 1 to make belts from the same conventionally prepared commercial coated abrasive cloth product, with the plastic film side of the patch not in contact with the coated abrasive, gave satisfactory joined belts.

EXAMPLE 3

This patch material was prepared in same manner as for Example 1, except that 220 denier 50 filament number high tenacity polyester yarns were used instead of 440 denier yarns. The resulting patch material had a thickness of 0.12 mm and a tensile strength of 35 daN/cm. When this patch material was applied under the same pressing conditions as in Example 1 to a conventionally backrubbed and otherwise prepared surface of a commercial coated abrasive product, joints satisfactory for somewhat lighter duty service than those made in Examples 1 and 2 resulted.

BEST MODE OF MAKING THE PATCH MATERIAL OF OUR INVENTION

Figure 4:
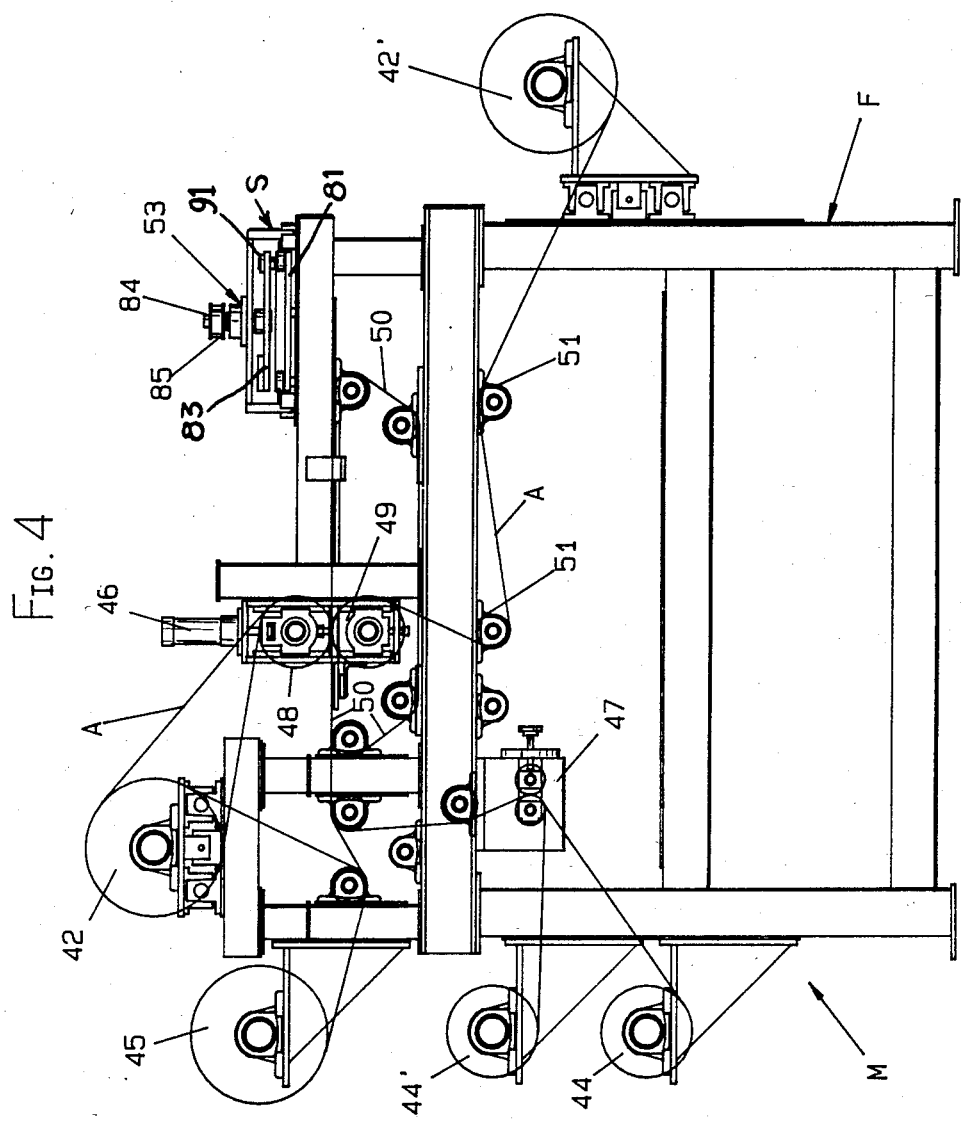
FIGS. 4-10 show characteristics of a machine, the operation of which constitutes the best method now known to us for making a product according to our invention.

The best mode known to us for making the patch material of our invention as described herein is to use a machine designed especially for the purpose. This machine is the subject of a separate patent application by Robert G. Kelly and Walter G. Spang entitled "Machine for Efficient Assembly of Biased Yarn Arrays" filed on the same date as this application and assigned to the same assignee as this application. A front view of this machine M is shown in FIG. 4. The main supporting framework F is constructed of welded, heavy duty tubular steel and is constructed with machined pads on mounting surfaces and is self-supporting. The entire machine can be moved as a unit while maintaining its dimensional integrity.

Unwind stands 42 and 42' are rigidly mounted directly to the machine frame. Webs A and A' of dry film adhesive, with or without auxiliary webs, can be supplied from unwind stands 42 and 42' to the laminating station 46. Windup roll 45 is used to store any release paper or similar material supplied on adhesive web A' but not desired in the final patch material. After lamination, the patch material is slit to the desired width in a conventional score slitting station 47, and the slit patch is accumulated on the two controlled tension windup rolls 44 which jointly comprise a conventional split winding station.

The lamination is accomplished between an upper cored rubber covered roller 48, which is adjustable in position vertically under the control of two air cylinders, and an electrically heated permanently positioned driven steel roller 49. In the direction perpendicular to the plane of FIG. 4, both these rolls fit between the two yarn carrier chains 50, of which only one is visible in FIG. 4. These yarn carrier chains run along a path as shown in FIG. 4, and yarn layout occurs in the straight upper part of the path between mechanism 53 and laminating station 46. The two chains run toward the laminating station 46 in this part of their path. In the part of this path immediately before reaching the compression rollers 48 and 49, the array of yarns may conveniently be preshrunk by exposing it to high temperatures as described above. Alternatively, the preferred tautness of the array before lamination could be achieved mechanically, such as by causing the path of the yarn carrier strips to diverge slightly in this region of their path.

The yarn carrier chains 50 are composed in their outer part of conventional triple width links designed to be driven by a toothed wheel which in turn is driven by the output of the same electric motor as that which drives the yarn laying mechanism described below, so that the two parts of the machine can operate with precisely matched timing, to be described further below. Triple links were chosen to promote maximum dimensional stability in the critical yarn laying area.

Figure 5:
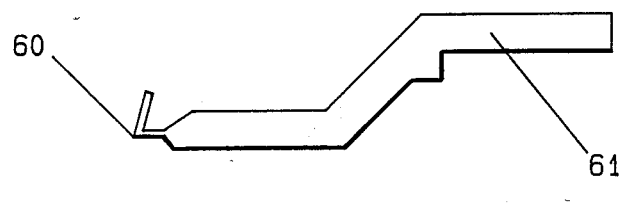

Attached rigidly to the inner part of each link of the drive chain is a set of yarn restrainers. Each restrainer is a small hook 60 with the shape shown in FIG. 5. The most stable position for a yarn is at the end of the lead line from the number 60 in that Figure, and the length of the hook above this point 60 is about 5 mm. The hook is supported by a shank 61 which is shaped as shown in the Figure to allow the mechanism for laying yarns to pass over the tops of the hooks and outside the line of hooks for a short distance without touching the shank. The hooks are spaced about 0.8 mm apart. Units of 16 hooks cast with a single supporting shank structure are available from Unitechna Aussenhandelgesellschaft, DDR-108 Berlin, Mohrenstrasse 53/54. These units are affixed to the chain links in such a positon that the uniform spacing between the hooks of a single set is continued between adjacent sets, so that a straight portion of the carrier chain presents a line of substantially uniformly spaced yarn restrainers facing inward along its entire length.

All webs other than the unencapsulated yarn array are guided through the machine under proper tension and positional control by numerous ball bearing mounted steel idler rolls 51.

Figure 6:
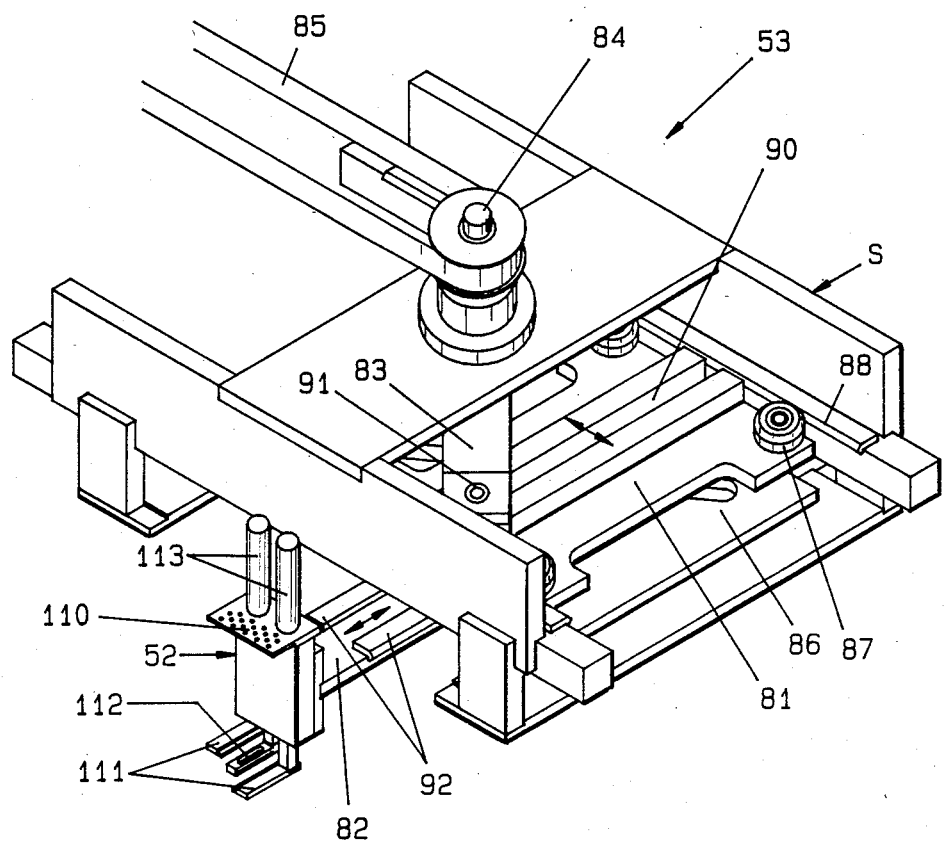

The mechanical means 53 for achieving the proper initial orientation of the yarns are shown in greater detail in FIG. 6, which is an isometric view of the parts of the machine, other than the yarn carrier chains, which control the positioning of the yarns. The line of FIG. 6 which is crossed by the lead lines from designating numbers 81, 86, and 87 lies along the front side of FIG. 4.

The structure marked S in FIG. 6 is a slideway rigidly attached to the machine frame and normally does not move during operation of the machine. The moving parts of primary interest are the upper sliding carriage 81, the lower sliding carriage 82, to which is attached the reciprocating yarn conveyor 52, and the upper carriage drive bar 83.

The upper sliding carriage 81 is supported by four grooved rollers 87, of which only three are visible in FIG. 6. These rollers fit into tracks 88 on each side of the carriage in such a fashion that the carriage is free to move along the direction indicated by the double headed arrow shown near the identifying FIG. 81 on FIG. 6, parallel to the direction of tracks 88. This direction is perpendicular to the line of motion of the yarn carrier chains and thus is into and out of the plane of FIG. 4.

The carriage 81 has on its upper surface a guide track 89 with a slot 90 extending across its entire width. A cylindrical guide rod 91, of which only the top is visible in FIG. 6, extends from the bottom of the guide bar 83 into the slot 90. The opposite end of guide bar 83 has a counterweight, not shown, to balance the weight of the guide rod. The guide rod has a diameter only slightly less than the width of the slot 90, so that as guide bar 83 is rotated during operation of the machine, the attached guide rod 91 urges the entire upper sliding carriage 81 back and forth along the path permitted by its sliding track.

The maximum amplitude of motion of the upper sliding carriage is sufficient to extend across a width slightly larger than the distance between the sets of yarn restrainers borne on the two yarn carrier chains, which determine the width of the web of patch material to be made. Guide bar 83 is driven by a shaft and pulley 84, which in turn is driven by belt 85, connected to and driven by the output shaft and pulley of an electric motor not shown. The same motor drives the yarn carrier chains, so that their motion can be exactly synchronized with that of the yarn laying carrier as described below.

Figure 7:
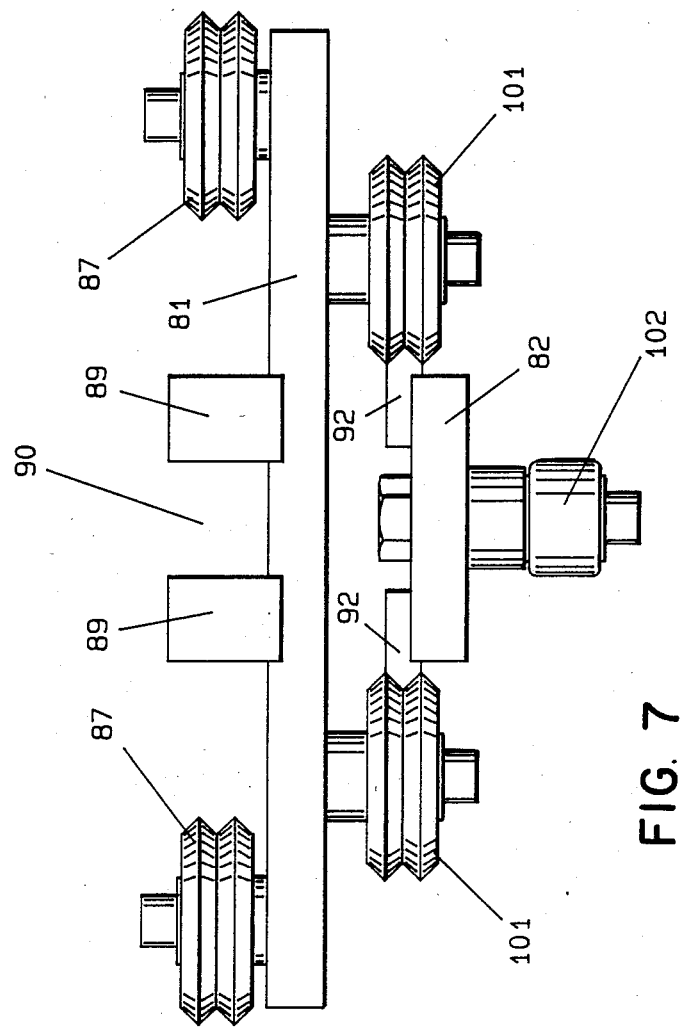

On the bottom of the upper sliding carriage 82 are attached four additional guide rollers 101 similar to those on the top. These bottom rollers 101 can not be seen in FIG. 6, but two of them are shown in FIG. 7, which is a side view of the upper and lower sliding carriage assembly only from the right side of FIG. 4, which is also the direction of the arrow marked S in FIG. 6. The lower sliding carriage 82, with attached tracks 92, fits between and is suspended by the rollers 101 and can move along the direction defined by the tracks 92 between the rollers 101; this direction of motion is shown by the double headed arrow near the designating FIG. 82 on FIG. 6. Thus the lower sliding carriage 82 can move with respect to the upper sliding carriage 81 along the direction perpendicular to that along which the upper sliding carriage can move with respect to the main machine frame.

Because the lower sliding carriage 82 is carried by and thus partakes of the motion of the upper sliding carriage 81, a given point on the lower sliding carriage can, within the constraints of these two motions, assume any position within a rectangle broad enough to span the distance between the lines of yarn restrainers 60 on the two yarn carrier chains and long enough to reach from one set of yarn restrainers to the opposite one when moving at an angle with respect to the yarn carrier chains 50 which is desired for the straight laid yarns.

Figure 8:
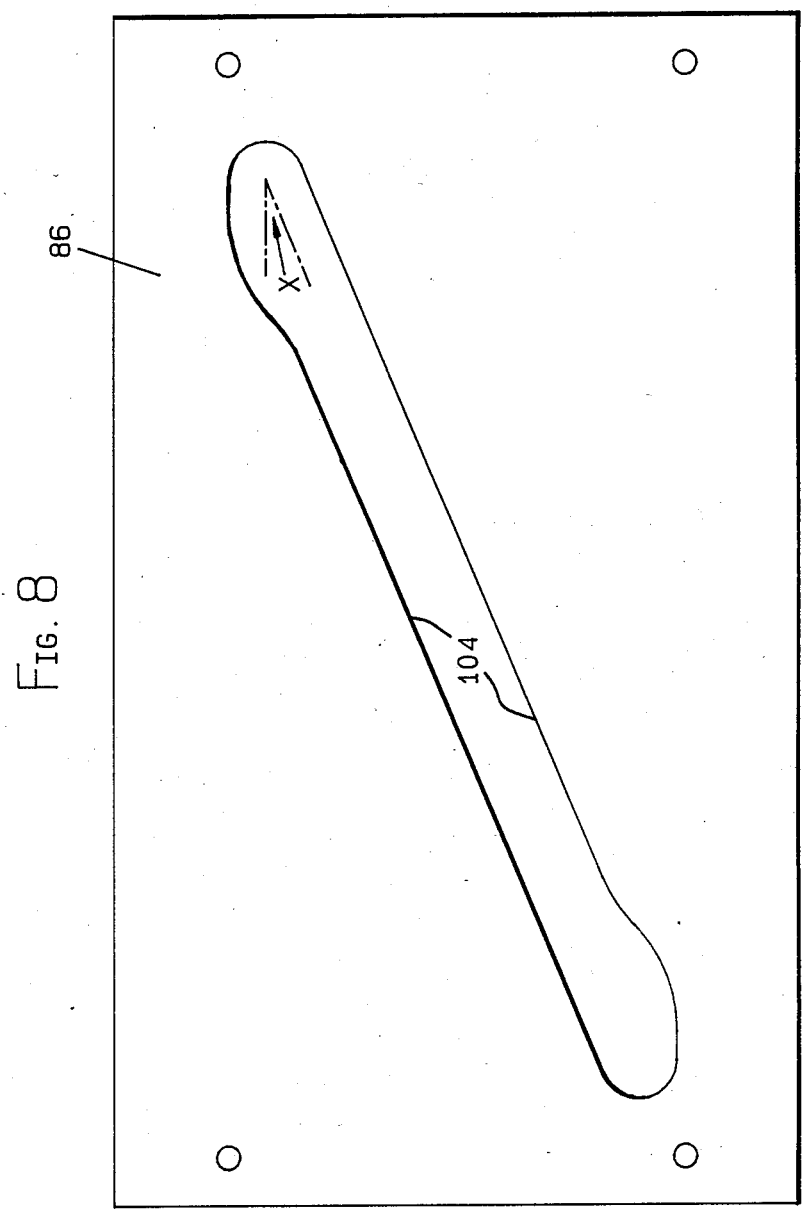

The actual positions which the lower sliding carriage 82 will assume in operation are determined by the interaction of a cam follower 102, attached to the lower sliding carriage, with a guiding cam slot 104 cut in guide plate 86. A small edge portion of the guide plate is shown in FIG. 6. A top view of the guide plate 86, showing the exact shape of the guiding cam track 104, is shown in FIG. 8. The central portion of the guiding cam track 104 consists of a parallel edged diagonal slot with width just slightly wider than the diameter of cam follower 102. The central axis of this slot is inclined an an angle X to the edges of the guide plate. The angle X corresponds to the complement of the central angle (with respect to the edges of the yarn carrier chains) around which the yarn array will be laid out by operation of the machine, and the length of the track formed by cam 104 is sufficient so that at each end of its travel, the reciprocating yarn conveyor 52 will convey the yarns being laid down slightly outside the line of yarn restrainers on that edge.

One side of the cam at each end is widened by a curved portion as shown in FIG. 8. The purpose of this widening is to cause the reciprocating yarn conveyor 52 to move with lower sliding carriage 82 from one extreme end of its travel back toward the center line of the machine in a path approximately perpendicular to the carrier chain edges rather than at its usual angle to these carrier chain edges. This motion causes the yarns to loop around the outside of the yarn restrainers on its return path.

As the yarn conveyor returns to the main part of the guide cam, the yarns which it is carrying are pulled, by the tension generated by the motion of the conveyor, back into the desired angle with respect to the carrier chain edges, leaving only a small loop around the restrainer to hold the yarn in place until it is encapsulated with adhesive. The edge part of the web which includes the looped ends of yarn is discarded after encapsulating and slitting.

The guide plate 86 is affixed to the machine frame by bolts and nuts, so that it can be easily interchanged with other guide plates for different angles of operation.

The direct yarn guiding devices are shown in FIG. 6. Yarns are fed from a conventional spool-loaded creel not shown, under conventional light tension control, to the eyelets in the upper yarn guideboard 110. The eyelets are provided with low friction plastic liners to minimize abrasion of the yarns. Normally each yarn is fed through an individual eyelet. If low density yarn layouts are desired, it is not necessary for every eyelet to be used. The yarns, which are not shown in any of the figures, pass from the upper yarn guideboard 110 to the lower yarn guideboard 112, which urges the yarns into a linear configuration called a small yarn array. Yarn depressors 111 are provided on each side of the lower yarn guideboard. These depressors are sufficiently long for the entire small array of yarn in the spacing defined by the lower yarn guideboard to pass under the depressors, and the small yarn array in fact passes under the one of the depressors which is situated rearward of the direction of motion of the lower yarn guideboard during most of the period of a cycle of the reciprocating yarn conveyor.

The yarn depressors 111 are capable of vertical motion from a position above the tops of the yarn restrainers 60 borne on the inner part of the yarn carrier chains to a position well below the point of most stable yarn positioning on the yarn restrainers. As the reciprocating yarn conveyor 52 passes approximately the central axis of the machine on its way toward one of the carrier strips, the depressor on the rearward side of the motion of the conveyor moves to its lowest position and the other depressor, which had been in its lowest position, rises to its highest one. The lowest position of the yarn depressors 111 is sufficiently far below the constant vertical position of the lower yarn guideboard 112 so that the portion of the yarns between these two parts of the conveyor makes an angle of about 60° with the horizontal. With continued motion of the conveyor, the lower yarn guideboard 112, which is vertically positioned so that it barely clears the tops of the yarn restrainer hooks, pulls the small yarn array across the tops of the hooks 60 and sufficiently far outside the line of hooks that the point of each yarn between adjacent hooks is just below the tops of the hooks. Because the carrier chains are moving forward continuously, this motion results in the retention of the yarns on the hooks as the conveyor begins to move backward toward the center of the machine. As the conveyor moves past the central axis of the machine toward the other carrier chain, the two depressors again reverse vertical positions. This downward motion of what is now the rearward depressor further urges the yarn edge loops most recently formed toward the position of maximum stability on the restrainer hooks and helps hold them in that position until the next set of yarn loops is made on the yarn restrainers borne on the opposite carrier chain.

Figure 9:
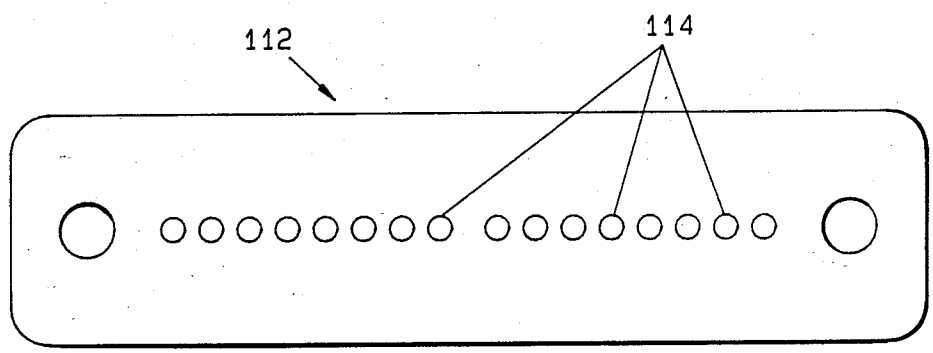

The pattern of eyelets in the lower yarn guideboard is correlated with certain other choices in the operation of the machine. The preferred pattern for the centers of these eyelets 114 is shown in FIG. 9, in which the diameter of the eyelets 114 is greatly exaggerated for drawing clarity; the actual eyelet diameter is about 1 mm. Each eyelet 114 in this guideboard carries a single yarn. The eyelets are arranged in two groups of equal number. The spacing between eyelets is uniform within each group, but the space between the two groups is about one and one half times as large as the spacing within one group. The reason for this spacing is that in the preferred mode of operation of the machine, the yarn carrier chains 50 are moved forward during each complete cycle of the reciprocating yarn conveyor by a distance which is just one half the width of the small yarn array emerging from the lower yarn guideboard 112. Thus, half of the small yarn array deposited by each cycle of the conveyor overlaps the last similar small array previously laid down. If the eyelets were evenly spaced throughout the entire lower yarn guideboard 112, an undesirable extra thickening of the overall composite yarn array would result from this overlap, at intervals along the line of yarn restrainers equal to half the width of the small yarn array. When the eyelets 114 are divided into two groups and the spacing between the two groups is substantially larger than that between adjacent yarns of each group but substantially smaller than twice that spacing, the most uniform pattern of the total array results. In this mode of operation, each yarn normally loops around two yarn restrainer hooks 60 when the spacing of these hooks is as specified above and the yarn density in the final yarn array is that of Example 1.

Because the motion of the yarn chain carriers continues while the reciprocating yarn conveyor is extending yarns from one side of the machine to the other, the pattern of yarns laid out consists of two parallel arrays oriented at approximately equal but opposite small angles from the angle X illustrated in FIG. 8.

It will be appreciated by those skilled in the art that many variations in operation are possible. For example, if a lower density layout of yarn is desired, only every alternate eyelet could be filled with a yarn.

Figure 10:
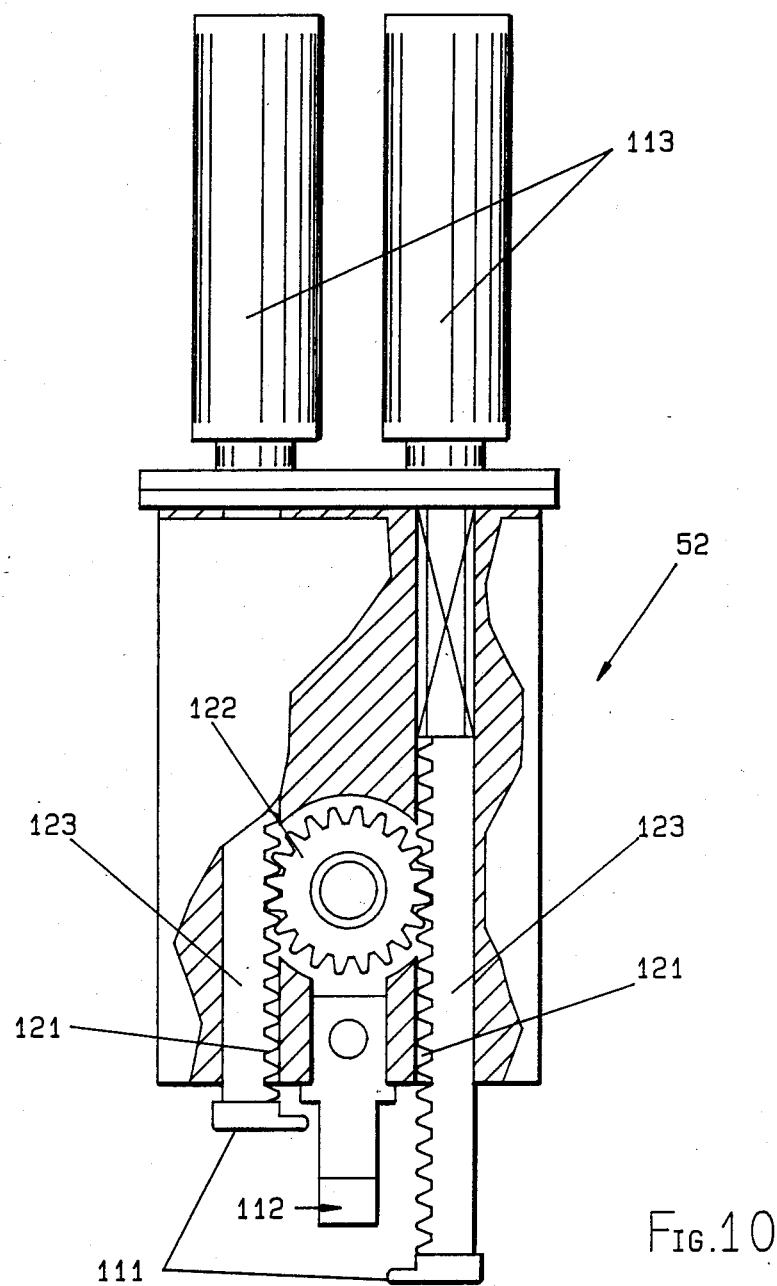

The positioning of the yarn depressors is controlled in part by air cylinders 113. These are single acting spring return air cylinders with 25 mm stroke length. Further details of the mechanism are shown in FIG. 10, which is a view, partially broken away, of yarn conveyor 52 from the direction of the right side of FIG. 4. The depressors 111 are mounted on thrust rods 123 which are provided with matching inner toothed tracks 121. The hatched surfaces in FIG. 10 are cross sections of solid metal structures which act as guideways for the thrust rods 123, so that the latter are constrained to move up and down only, with no significant sidewise motion. The tracks 121 engage with a rotatable spur gear 122 in such a fashion that the downward motion of one of the depressor thrust rods requires upward motion of the other depressor thrust rod by the same distance. Conventional electric relays and sensors not shown determine which of the air cylinders 113 is supplied with appropriate air pressure to lower or raise its attached thrust rod and depressor, depending on the position of the reciprocating yarn conveyor assembly with respect to the two yarn carrier chains.

To start making patch material, the ends of the yarns of a small yarn array are drawn manually through the lower yarn guideboard and tied to one or more of the yarn restrainers on one carrier chain. Power is then applied to move the various components of the machine as described above.

While our invention has been described principally with respect to the use of our patch material in joining coated abrasives into endless belts, it should be understood that it can be useful for joining any material when joints with good tensile resistance are desired.

We claim:

1. A joining tape comprising a straight laid narrowly multidirectional yarn array with an upper limit of not more than 20° a lower limit of not less than 0.5° and an adhesive encapsulating said yarn array.

2. A tape according to claim 1 wherein said adhesive is capable of forming a strong bond to a suitably prepared coated abrasive backing material.

3. A joining tape as in claim 1, wherein said straight laid narrowly multidirectional yarn array has an upper limit of 5° and a lower limit of 1.5°.

4. A tape according to claim 3 wherein said adhesive is capable of forming a strong bond to a suitably prepared coated abrasive backing material.

5. A tape according to claim 3 wherein said yarn array occupies more than half the combined volume of said yarn array and said adhesive.

6. A tape according to claim 5 wherein said adhesive is capable of forming a strong bond to a suitably prepared coated abrasive backing material.

7. A tape according to claim 5 wherein said yarn array comprises primarily synthetic multifilament polyester yarns having a twist of not more than one turn per centimeter, said yarn array including at least 1000 monofilaments per centimeter of tape width.

8. A tape according to claim 7 wherein said adhesive is capable of forming a strong bond to a suitably prepared coated abrasive backing material.

9. A tape according to claim 7 having a thickness no greater than 0.25 millimeter.

10. A tape according to claim 9 wherein said adhesive is capable of forming a strong bond to a suitably prepared coated abrasive backing material.

11. A tape according to claim 1 wherein said yarn array occupies more than half the combined volume of said yarn array and said adhesive.

12. A tape according to claim 11 wherein said adhesive is capable of forming a strong bond to a suitably prepared coated abrasive backing material.

13. A tape according to claim 11 wherein said yarn array comprises primarily synthetic multifilament polyester yarns having a twist of not more than one turn per centimeter, said yarn array including at least 1000 monofilaments per centimeter of tape width.

14. A tape according to claim 13 wherein said adhesive is capable of forming a strong bond to a suitably prepared coated abrasive backing material.

15. A tape according to claim 13 having a thickness no greater than 0.25 millimeter.

16. A tape according to claim 15 wherein said adhesive is capable of forming a strong bond to a suitably prepared coated abrasive backing material.

* * * * *